(12) United States Patent
De Cnodder et al.

(10) Patent No.: US 6,912,226 B2
(45) Date of Patent: Jun. 28, 2005

(54) METHOD TO GENERATE AN ACCEPTANCE DECISION IN A TELECOMMUNICATION SYSTEM

(75) Inventors: Stefaan De Cnodder, Lille (BE); Omar Elloumi, Antwerp (BE); Kenny Julien Pauline Pauwels, Temse (BE)

(73) Assignee: Alcatel, Paris (FR)

( * ) Notice: Subject to any disclaimer, the term of this patent is extended or adjusted under 35 U.S.C. 154(b) by 831 days.

(21) Appl. No.: 09/795,192

(22) Filed: Mar. 1, 2001

(65) Prior Publication Data

US 2001/0026555 A1 Oct. 4, 2001

(30) Foreign Application Priority Data

Mar. 29, 2000 (BE) .......................................... 00400864

(51) Int. Cl.[7] .......................... H04L 12/28; H04L 12/56
(52) U.S. Cl. ........................ 370/412; 370/235; 370/229
(58) Field of Search .................................. 370/412, 229, 370/230, 230.1, 235, 236, 413, 414, 415, 416, 417, 418, 395.71, 401, 428, 429, 352, 419, 395.21, 395.42

(56) References Cited

U.S. PATENT DOCUMENTS

| | | | | |
|---|---|---|---|---|
| 5,822,300 A | * | 10/1998 | Johnson et al. ............. | 370/229 |
| 6,160,793 A | * | 12/2000 | Ghani et al. ................ | 370/236 |
| 6,628,610 B1 | * | 9/2003 | Waclawsky et al. ........ | 370/229 |
| 6,721,273 B1 | * | 4/2004 | Lyon .......................... | 370/235 |

OTHER PUBLICATIONS

Zhiruo Cao et al.: "Rainbow fair queueing: fair bandwidth sharing without per–flow state" Proceedings IEEE Infocom 2000, Conference on Computer communications. 19th Annual Joint Conference of the IEEE Computer and Communications Societies, Tel Aviv, Israel, Mar. 26–30, 2000, pp. 922–931, vol. 2, XP002150272, Piscataway, NJ, USA, ISBN: 0–7803–5880–5.

(Continued)

*Primary Examiner*—Brian Nguyen
(74) *Attorney, Agent, or Firm*—Sughrue Mion, PLLC

(57) ABSTRACT

The invention relates to a method for use in a telecommunication system to generate an acceptance decision during a decision cycle that comprises whether to accept an incoming packet of a data stream or not in a buffer (BUF). The incoming packet (P) has a drop priority (DP) being one of a plurality of arranged drop priorities. The method comprises determining for a drop priority parameter (DPP) an actual drop priority parameter value (DPPact) out of the plurality of drop priorities; and comparing the drop priority parameter (DPP) with the drop priority (DP) of the packet (P) in order to generate the acceptance decision. The method further comprises that the step of determining the actual drop priority parameter value (DPPact) comprises determining a previous drop priority parameter value (DPPprev) by means of any one of an initial value (DPPinit) and a previous actual drop priority parameter value (DPPact') having been determined during one of a previous decision cycle; and updating a queue occupancy variable (Q) as a function of a previous re-scaled queue occupancy value (RE-Qact') having been determined during one of a previous decision cycle and providing thereby an intermediate queue occupancy value (Qint); and re-calculating the intermediate queue occupancy value (Qint) of the queue occupancy variable (Q) in function of instantaneous queue occupancy information (INF-Qins) of the buffer (BUF) and providing thereby an actual queue occupancy value (Qact); and comparing the actual queue occupancy value (Qact) with any one of a minimum threshold (Tmin) and a maximum threshold (Tmax) and providing thereby a result (RES (UP; DO; REM)); and according to the (RES (UP; DO; RET)) re-scaling the actual queue occupancy value (Qact) and the previous drop priority parameter value (DPPprev) and providing thereby, respectively, a re-scaled queue occupancy value (RE-Qact) and the actual drop priority parameter value (DPPact).

7 Claims, 1 Drawing Sheet

OTHER PUBLICATIONS

Goyal, M. et al.: "Effect of number of drop precedences in assured forwarding" Seamless Interconnection for Universal Services. Global Telecommunications Conference. Globecom '99, Rio De Janeireo, Brazil, Dec. 5–9, 1999, pp. 188–193, vol. La, XP002150273, Piscataway, NJ, USA, IEEE, ISBN: 0/7803–5796–5.

Petr, D. W. et la.: "Nested Threshold Cell Discarding for ATM Overload Control: Optimization Under Cell loss Constraints" Proceedings of the Annual Joint Conference of the Computer and Communication Societies. (Inforcom), US, New York, IEEE, vol. Conf. 10, Apr. 7, 1991, pp. 1403–1412, XP000223471 ISBN: 0–87942–694–2.

* cited by examiner

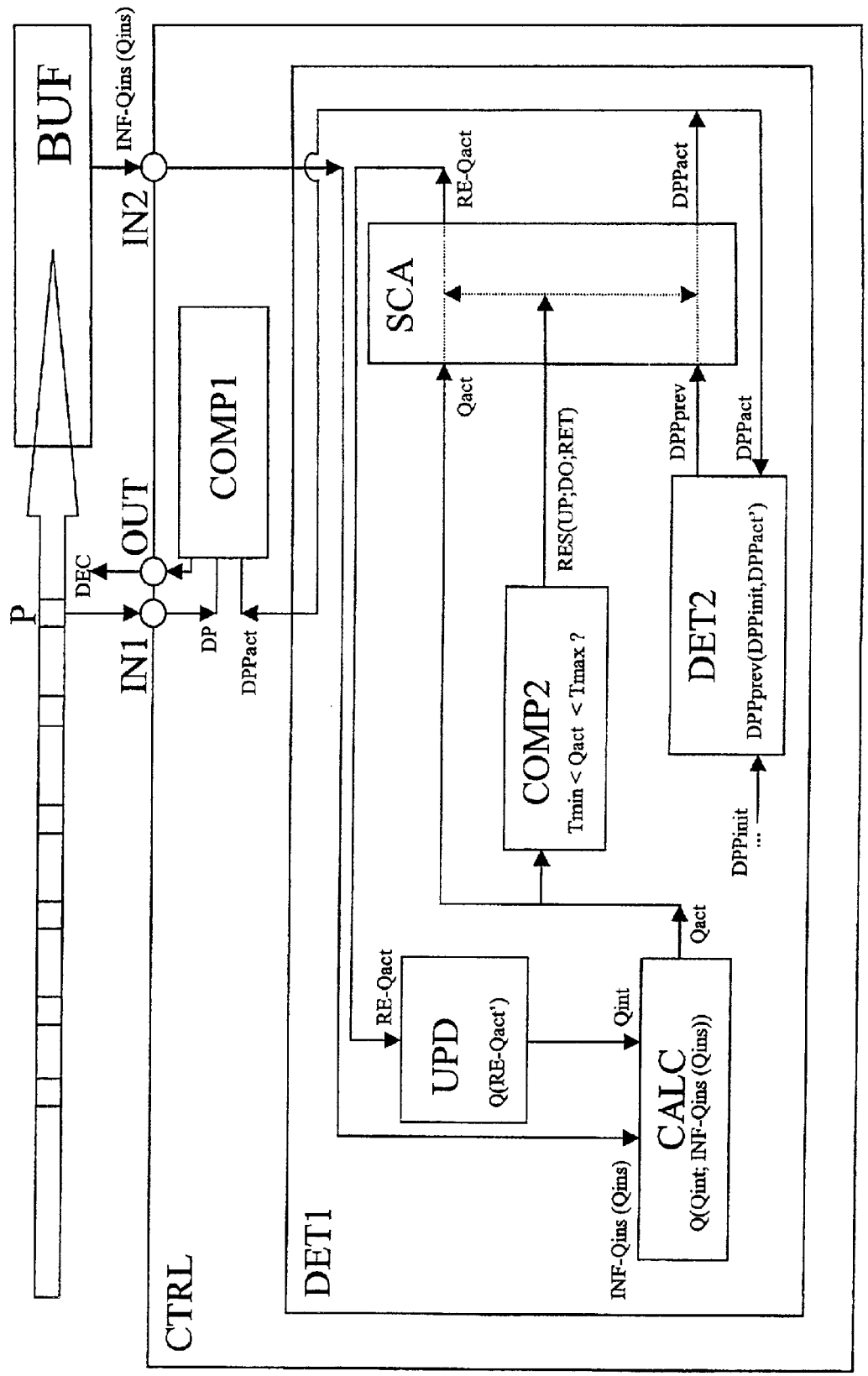
Figure

METHOD TO GENERATE AN ACCEPTANCE DECISION IN A TELECOMMUNICATION SYSTEM

BACKGROUND OF THE INVENTION

The present invention relates to a method for use in a telecommunication network, for making an acceptance decision on whether or not to accept an incoming data packet into a buffer, to a controlling device that realizes the method, and to a telecommunication network including such a device.

Today's telecommunication networks such as, e.g. the internet, are fast developing. Traffic is processed as quickly as possible but also the guarantee as to timelines and actual delivery are evolving. With the rapid transformation of the Internet into a commercial infrastructure, demands for different levels of service have rapidly developed. It is becoming apparent that several service classes are necessary each with its own fields of application.

For example, in the header of an Asynchronuous Transfer Mode packet a priority bit is included in order to indicate the kind of priority this packet should receive, a Type of Service byte or a diffserv Code point is included in the header of an Internet packet for indicating the Quality of Service QoS the IP-packet should receive. This is called Differentiated Services.

The loss priority, also called in this document drop priority, or simply priority, of these Differentiated Services are often referred to by a color, e.g., green for packets that should receive the highest priority, called highest loss priority; yellow for packets that should receive the second highest priority and red for packets the should receive the lowest priority, called lowest loss priority.

Differentiated services do not define services per-se, but rather Per Hop Behaviors PHB's. These are intended to allow Internet service providers complete freedom to construct, from PHB's, the intra-domain services they believe will meet their customers' needs. One of the types of mechanism that are known to achieve this type of service is the buffer acceptance mechanism to obtain more stable queues in, e.g., the core routers or edge routers.

Such a method for use in a telecommunication system to generate an acceptance decision during a decision cycle that comprises whether to accept an incoming packet of a data stream in a buffer or not is already known in the art. Indeed, an often used and suitable congestion control mechanism for different routers is called the Random Early Detection mechanism or shortly called Red. This Red mechanism accepts or drops a packet according to the overall average queue length of the buffer, a predefined minimum threshold, a predefined maximum threshold and a predefined maximum drop probability. Red is an active queue management scheme that tries to keep the overall throughput high while maintaining a small average queue length. When the average queue occupancy is below the minimum threshold, no packets are dropped. When the average queue size exceeds the minimum threshold, packets are dropped with an increasing probability. When the average queue size exceeds the maximum threshold, all arriving packets are dropped.

However, in extending RED for service differentiation, i.e., when a large number of drop priorities is used, some disadvantages occur. Indeed, a straightforward implementation of n different drop priorities for such an extended Red mechanism, as well as for some other known buffer acceptance mechanisms, is defining for each drop priority a value for the above mentioned three parameters. One or more parameter values of these three parameters, i.e., minimum threshold, maximum threshold and the drop probability at maximum threshold, differ between the different classes, i.e., drop priorities. In this way, according to an actual value for an average queue length of the buffer, a set of parameters related to a certain drop priority is applied. Indeed, when applying such an extended Red mechanism in, e.g., a fair bandwidth allocation approach, the values of the parameters for the different drop priorities are to be defined such that the minimum threshold of drop priority x, e.g., yellow is bigger than or equal to the maximum threshold that is defined for the drop priority x+1, e.g., red. In this way, all the packets of a data stream of layer x+1 are discarded before starting to drop the packets from layer x. The packets with a higher drop priority value, e.g., value 2 for red, are discriminated from those with a lower drop priority value, e.g. value 1 for yellow.

It has to be highlighted here that the packets with the highest drop priority value, e.g. value x+1 for red, are those packets that receive the lowest priority.

The different steps of such an extended Red mechanism, i.e., a method for use in a telecommunication system to generate an acceptance decision during a decision cycle that comprises whether to accept an incoming packet of a data stream in a buffer or not, are:

determining for a drop priority parameter an actual drop priority parameter value out of the plurality of drop priorities; and comparing the drop priority with the drop priority of the incoming packet in order to generate the acceptance decision.

In this way, the extended Red mechanism firstly determines according to the actual average queue length of the buffer that is compared to the arranged predefined minimum thresholds and maximum thresholds the associated drop priority parameter, i.e., an actual drop priority parameter value. The drop priority parameter value that is associated with a set of predefined minimum and maximum thresholds between which the actual queue length of the buffer is located provides the actual value for the drop priority parameter. Secondly this actual drop priority parameter value is compared to the drop priority of the incoming packet in order to generate the acceptance decision. The acceptance decision is, according to the above described extended Red mechanism, determined in such a way that the packets with a higher drop priority value as the actual drop priority parameter value are always discarded, and that the packets with a lower drop priority. value as the drop priority parameter value are always accepted, and that the packets with a drop priority equal to the actual drop priority parameter value are dropped with an increasing probability. The drop priority parameter value determines the drop priority class that will be dropped probabilistically.

A problem however, with such an extended Red mechanism as described above and also with other buffer acceptance mechanisms that are defining for each drop priority an additional set of parameters, is that the number of parameters increases linearly as a function of the number of installed drop priorities. Configuration of such a buffer acceptance mechanism becomes complex for, e.g., an operator since it is difficult to define the good values for all these parameters of all the different classes, i.e., too many parameters are to be defined and dimensioned.

SUMMARY OF THE INVENTION

An object of the present invention is to provide a method for use in a telecommunication system to generate, during a decision cycle, an acceptance decision that comprises whether or not to accept into a buffer an incoming packet of a data stream with a predefined drop priority, such as the above known methods that are supporting different services, but which keeps the advantages of discriminating packets with a higher drop priority value from those with a lower drop priority value and the simplicity of implementation.

According to the invention, this object is achieved by a method which determines the drop priority parameter according to the following steps:

determining a previous drop priority parameter value by means of any one of an initial value and a previous actual drop priority parameter value that has been determined during a previous decision cycle; and updating a queue occupancy variable as a function of a previous rescaled queue occupancy value having been determined during one of a previous decision cycle, and providing thereby an intermediate queue occupancy value; and re-calculating the intermediate queue occupancy value of the queue occupancy variable as a function of instantaneous queue occupancy information of the buffer and providing thereby an actual queue occupancy value; and comparing the actual queue occupancy value with any one of a minimum threshold and a maximum threshold and providing thereby a result; and according to the result, re-scaling the actual queue occupancy value and the previous drop priority parameter value and providing thereby, respectively, a re-scaled queue occupancy value and the actual drop priority parameter value.

The invention is further directed to a controlling device that accomplishes this method and to a telecommunications network incorporating such a device.

By determining the actual drop priority parameter value according to the above described different steps, only one set of thresholds, i.e., minimum threshold and maximum threshold has to be defined; There is also a change in actual drop priority parameter value achieved by carefully re-scaling this drop priority parameter in the event when a queue occupancy variable is to be re-scaled. This queue occupancy variable is determined as a function of instantaneous queue occupancy information of the buffer and is monitored against this only set of thresholds. By monitoring, i.e., updating, re-calculating and comparing this one extra queue occupancy variable, the method is made multiple service aware but it maintains the simplicity of an original buffer acceptance method without service differentiation.

It should be noted that although according to the wording of the claims the drop priority parameter and the queue occupancy variable are at a certain moment determined according to previous values of a previous decision cycle, it is to be understood that such a previous value can be a value of the decision cycle just before the actual decision cycle, as well as a value of a decision cycle more than one decision cycle ago.

It is also to be noted that the instantaneous queue occupancy information used in the step to re-calculate the intermediate queue occupancy value of the queue occupancy variable is to be understood as instantaneous information related to the buffer but presented in different ways, e.g., an instantaneous buffer filling level or a difference in instantaneous buffer filling level from one decision cycle versus a following decision cycle.

It should further be noted that the queue occupancy variable might be implemented by an actual filling level of the buffer but that much better results are generated by implementing the queue occupancy variable by means of the changes of the average queue size of the buffer. This will become more clear in the description below.

Still further, the result of the step of comparing the actual queue occupancy value with any one of a minimum threshold and a maximum threshold can comprise an up-re-scaling, a down-re-scaling or a retaining result. More particularly, the method may be characterized in that the step of comparing the actual queue occupancy value with any one of a minimum threshold and a maximum threshold comprises up re-scaling the result when the actual queue occupancy value becomes smaller than the minimum threshold, and down re-scaling the result when the actual queue occupancy value becomes larger than said maximum threshold; and retaining the result when the actual queue occupancy value remains between the minimum threshold and the maximum threshold.

According to a preferred embodiment of the invention, in the event the result is an up-re-scaling result, scaling up the actual re-scale queue occupancy and scaling up the previous drop priority parameter value to one of the plurality of drop priorities higher than the previous drop priority parameter value; and in the event the result is a down-re-scaling result, scaling down the actual queue occupancy value and scaling down the previous drop priority parameter value to a value of one of the plurality of drop priorities which is lower than the previous drop priority parameter value; and in the event the result is a retained result, retaining the actual re-scale queue occupancy and the previous drop priority parameter value.

When the queue occupancy variable exceeds the maximum threshold, it is considered that the method is not dropping enough packets to reach a stable operation point, and thus more packets must be dropped, but only in increasing order of its drop priority, i.e., discriminating packets with a higher drop priority value, e.g., red from those packets with a lower drop priority value, e.g., yellow.

On the other hand, when the queue occupancy variable drops beneath the minimum threshold, the method increases the queue occupancy variable to, e.g., the maximum threshold and the actual drop priority parameter value is increased. The idea is opposite to the above, i.e., the method drops to harshly, so the amount of dropped packet is lowered.

As was explained earlier, the step of comparing the drop priority parameter with the drop priority of the incoming packet generates an acceptance decision that can comprise one of the following three options: discarding, accepting or probabilistically dropping.

According to a further aspect of the invention, the step of re-calculating the intermediate queue occupancy value of the queue occupancy variable as a function of instantaneous queue occupancy information of the buffer comprises substantially equalizing the actual queue occupancy value to the intermediate queue occupancy value in the event either an instantaneous queue occupancy information comprises an instantaneous buffer filling level above the maximum threshold but the instantaneous buffer filling level is decreasing in time, or an instantaneous queue occupancy information comprises an instantaneous buffer filling level below the minimum threshold but the instantaneous buffer filling level is increasing in time.

This feature is included to speed up the convergence of the method to the correct drop priority parameter value, to allow bursts in the network and to prevent instability after, e.g., a re-scaling action of the queue occupancy variable. The real calculation of the queue occupancy variable isn't done on every packet arrival. The two above-mentioned cases are considered hereafter. Indeed, when congestion occurs in the buffer, the instantaneous buffer filling level will keep on growing and this will be reflected in the queue occupancy variable that grows beyond the maximum threshold. From that moment on, the drop priority parameter will change in value and the queue occupancy variable will be re-scaled. It will take time for the increased number of drops to be reflected in the instantaneous buffer filling level and hence in the queue occupancy variable. However, if this is the correct drop priority parameter value, the instantaneous buffer filling level will decrease and finally the queue occupancy variable will remain stable between the minimum threshold and the maximum threshold. Thus from the moment we see that the instantaneous buffer filling level size is falling, the queue occupancy variable is not updated as long as the instantaneous is above the maximum threshold. Similar to the previous case, when the instantaneous buffer filling level is below the minimum threshold and the slope of the instantaneous buffer filling level is greater than zero, no real re-calculating is performed and the actual queue occupancy value is made substantially equal to the intermediate queue occupancy value.

It should be noted that the term 'comprising', used in the claims, should not be interpreted as limiting the invention to the components listed thereafter. Thus, the scope of the expression 'a device comprising A and B' should not be limited to devices consisting only of components A and B. It means that, with respect to the present invention, the only relevant components of the device are A and B.

Similarly, it is to be noted that the term 'coupled', also used in the claims, should not be interpreted as limiting the invention to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

BRIEF DESCRIPTION OF THE DRAWINGS

The above and other objects and features of the invention will become more apparent and the invention itself will be best understood by referring to the following description of an embodiment taken in conjunction with the accompanying FIGURE that represents a buffer with a controlling device for use in a router of a telecommunication system.

DETAILED DESCRIPTION OF THE INVENTION

Referring to this FIGURE a controlling device CTRL will be described. First the working of the controlling device will be explained by means of a functional description of the blocks shown in the FIGURE. Based on this description, implementation of the functional blocks will be obvious to a person skilled in the art and will therefor not be described in detail. In addition a principle working of the control device CTRL will be described in further detail.

The controlling device CTRL and the buffer BUF are comprised in a router of a telecommunication system. The telecommunication system supports differentiated services. Hereby the packets of a data stream that are routed by the router comprise a drop priority indication. The drop priority indication can be implemented according to different ways. Since this is however not the aim of the invention, this will not be described here in further details. The aim is the fact that each incoming packet of the data stream comprises a drop priority and that this drop priority can be deducted from the packet.

The buffer BUF is storing accepted data packets of the data stream and is preferred to be a first in first out buffer BUF. This is shown in the FIGURE. The buffer BUF comprises controlling means (not shown) that comprises e.g. instantaneous queue occupancy information INF-Qins of the buffer BUF. This will be explained in a further paragraph. The buffer BUF is coupled to an input IN2 of the controlling device CTRL of the present invention. The controlling device CTRL is further coupled via input IN1 and output OUT to an input of the router that receives the incoming data packets of the data stream.

The controlling device CTRL is comprised in the router to generate an acceptance decision during a decision cycle. The acceptance decision comprises whether to accept an incoming data packet of the data stream or not. The incoming packet has a drop priority DP that is anyone of a plurality of arranged drop priorities. For this embodiment is preferred to name the drop priorities 'colors'. Three drop priorites i.e. three colors are defined green G, yellow Y and red R.

It has to be remarked that although for this preferred embodiment three drop priorities are defined, it is clear to a person skilled in the art that implementation of the present invention is not limited to only three drop priorities but that different numbers of drop priorities can be used.

The control device CTRL comprises a first determiner DET1 that is coupled to a first comparator COMP1. The first comparator COMP1 is coupled to the first input IN1 and the output OUT of the controlling device CTRL. The first determiner DET1 is coupled to the buffer BUF via a second input IN2.

The first determiner DET1 is comprised in the controlling device CTRL to determine for a drop priority parameter DPP an actual drop priority parameter value DPPact. The value that is determined is a value out of the predefined set of drop priorities G, Y and R. The value of the drop priority DPP reflects the drop priority i.e. the color that is dropped probabilistically according to present method.

The first comparator COMP1 is comprised to compare the actual drop priority parameter value DPPact with the drop priority DP of the incoming packet P. The first comparator COMP1 generates hereby the acceptance decision DEC i.e. discarding the incoming packet, accepting the incoming packet or probabilistically dropping the incoming packet similar to the known extended random early detection mechanism. This means that in the event when the drop priority parameter equals the drop priority of the packet the acceptance decision results in probabilistically dropping the packet; in the event when the drop priority parameter value is bigger than the drop priority value of the packet the acceptance decision results in accepting the packet and in the event when the drop priority parameter value DPP is smaller than the drop priority value of the packet the acceptance decision results in discarding the packet P.

The first determiner DET1 comprises: a second determiner DET2, an updater UPD, a re-calculator CALC, a second comparator COMP2 and a re-scaler SCA.

The second determiner DET2 is coupled to the re-scaler SCA and comprises furthermore a second input to receive an initial value for the drop priority parameter DPPinit. The updater UPD is coupled to the re-calculator CALC. The re-calculator CALC is furthermore coupled to input IN2 of the controlling device CTRL, to the second comparator COMP2 and to the re-scaler SCA. The second comparator COMP2 is also coupled to the re-scaler SCA. The re-scaler SCA is coupled back to the updater UPD and to the second determiner DET2 and is furthermore coupled to the first comparator COMP1.

The initial value DPPinit is a constant value that is predetermined by e.g. the operator of the controlling device CTRL. It has to be remarked that according to this preferred embodiment this initial value DPPinit is determined by means of an estimation of the average input rate of each drop priority. A break even is searched for an increasing sum of the estimated arrival rates of each color versus the total link rate at the input of the router. The sum of the estimated arrival rates starts with the estimated arrival rate associated to the color with the highest priority i.e. green G and ends with the estimated arrival rate of the color for which just no break even is reached i.e. the total sum of arrival rates doesn't exceeds the total link rate. An increase of the total sum with the estimated arrival rate of the following color should exceed the total link rate. In this way the right color i.e. initial value for the drop priority parameter is determined by this following color. It has to be remarked that this method of determining a value for the initial drop priority parameter is a rather complex method that is suitable for determining the initial value but that is not to be preferred for determining an actual drop priority parameter value DPPact for each arriving packet of the data stream.

The second determiner DET2 is comprised to determined a previous drop priority parameter value DPPprev by means of either the initial value DPPinit or by means of a previous actual drop priority parameter value DPPact' that was determined during one of a previous decision cycle. It has to be understood that only at initialization time or re-initialization time the initial value is used and furthermore a previous value is used to determine the previous actual drop priority parameter value DPPact'.

According to the present invention one extra variable is defined in order to determine the actual drop priority parameter value DPPact. This variable is called the queue occupancy variable and reflects a kind of measure for the queue occupancy of the buffer BUF. The preferred measure for the queue occupancy variable is an average queue occupancy. This will be further described in a following paragraph.

The updater UPD is comprised to update the queue occupancy variable Q in function of a previous re-scaled queue occupancy value RE-Qact' that was determined during one of a previous cycle and that was fed back by the re-scaler SCA. The updater UPD provides hereby an intermediate queue occupancy value Qint.

The re-calculator CALC is comprised to re-calculate the intermediate queue occupancy value Qint of the queue occupancy variable in function of instantaneous queue occupancy information INF-Qins provided by the buffer BUF. According to this preferred embodiment the instantaneous queue occupancy information comprises a measure of how much the instantaneous buffer filling level at a time of arrival of the incoming packet deviates from the instantaneous buffer filling level at the time of arrival of the previous packet. According to this information the intermediate queue occupancy value Qint of the queue occupancy variable is eventual re-calculated. According to this preferred embodiment the queue occupancy variable is re-calculated i.e. adjusted with the forwarded instantaneous queue occupancy information in order to obtain a new average queue occupancy i.e. an actual queue occupancy value Qact.

The second comparator COMP2 is comprised to compare the actual queue occupancy value Qact with the minimum threshold and the maximum threshold and provides hereby a result RES. In the event when the actual queue occupancy value Qact became smaller as the minimum threshold Tmin, the result comprises an up-re-scaling RES(UP). In the event when the actual queue occupancy value Qact became bigger as the maximum threshold Tmax, the result comprises a down-re-scaling RES(DO). In the event when the actual queue occupancy value Qact remains between the minimum threshold and the maximum threshold the result comprises a retaining result RES(RET).

The re-scaler SCA is comprised to re-scale, according to the result RES, the actual queue occupancy value Qact and the previous drop priority parameter DPPprev and to provided thereby a, respectively, re-scaled queue occupancy value RE-Qact and an actual drop priority parameter value DPPact. The result of the second comparator COMP2 comprises anyone of an up-re-scaling result RES(UP), a down re-scaling result RES(DO) or a retaining result RES(RET).

In the event when the result RES comprises an up-re-scaling result RES(UP), the actual queue occupancy Qact and the previous drop priority parameter are scaled up. This means that the value of the actual queue occupancy Qact is increased with a predetermined first constant value. A preferred choice for this constant value is that the resulting re-scaled queue occupancy value RE-Qact becomes equal to the maximum threshold Tmax. The up re-scaling of the previous drop priority parameter value results in a value of a drop priority that is one higher as the previous value e.g. yellow becomes red.

In the event when the result RES comprises a down-re-scaling result RES(DO), the actual queue occupancy Qact and the previous drop priority parameter are scaled down. This means that the value of the actual queue occupancy Qact is decreased with a predetermined second constant value. A preferred choice for this constant value is such that the resulting re-scaled queue occupancy value RE-Qact is equal to the minimum threshold Tmin. The down re-scaling of the previous drop priority parameter value results in a value of a drop priority that is one smaller as the previous value e.g. yellow becomes green.

In the event when the result RES comprises a retaining result RES(RET), the actual queue occupancy Qact and the previous drop priority parameter are kept. This means that the re-scaled queue occupancy value RE-Qact substantially equals the actual queue occupancy Qact and that the actual drop priority parameter value substantially equals the previous drop priority parameter value DPPprev.

In the following paragraph the functional working of the controller CTRL will be described by means of an example.

Presume a situation that a data stream is received by the router and forwarded towards the buffer in order to be accepted or discarded. Each data packet of the data stream comprises a reference to its drop priority DP i.e. its level of treatment. Presume a telecommunication network that works with three drop priorities such as described in an earlier paragraph: the lowest priority for the packets with color red with a drop priority value equal to 2; and a higher priority for the packets with color yellow with a drop priority value equal to 1; and a highest priority for the packets with color green with a drop priority value equal to 0.

Presume an incoming packet P that has a drop priority that equals to 0 i.e. a green packet.

Presume that the instantaneous buffer filling level Qins as well as the queue occupancy variable Q have a value between the minimum threshold Tmin and the maximum threshold Tmax. Furthermore it is presumed that the queue occupancy variable Q reflects an average queue length of the buffer BUF. The drop priority parameter DPP has an actual value that is equals to 2.

The drop priority DP of the packet P is extracted from the packet and is forwarded via input IN1 of the controller CTRL to the first comparator COMP1.

In the mean time, upon arriving of the packet P, the first determiner DET1 initiated the second determiner DET2 and the updater UPD in order to determine a previous drop priority value DPPprev and to update the queue occupancy variable Q as a function of the previous re-scaled queue occupancy value RE-Qact'. As it was presumed the previous drop priority value DPPprev equals to 2 and the previous re-scaled queue occupancy value RE-Qact' is a value between Tmin and Tmax. This means that the provided intermediate queue occupancy value Qint is a value between Tmin and Tmax.

This value of the queue occupancy variable Q is eventually recalculated by the calculator CALC in function of instantaneous queue occupancy information INF-Qins of the buffer BUF. Since the queue occupancy variable Q, as it was mentioned above, reflects an average queue length the formulae used by the re-calculator CALC is defined accordingly. The intermediate queue occupancy value Qint is tuned with the instantaneous queue occupancy information INF-Qins in order to generate a finer average queue length as the actual queue occupancy value Qact. It has to be remarked that the exact formula goes beyond the aim of the invention and is not further described here. The aim is that the queue occupancy variable Q is re-calculated and that a new actual queue occupancy value is provided Qact. Since as well the intermediate queue occupancy value Qint as the instantaneous buffer filling level have a value between Tmin and Tmax, it is clear to a person skilled in the art that the actual queue occupancy value has also a value between Tmin and Tmax.

The actual queue occupancy value Qact is compared by the second comparator COMP2 versus Tmin and Tmax. As mentioned above, the queue occupancy value Qact is a value between Tmin and Tmax, the comparator COMP2 a retaining result RES(RET)). This retaining result RES(RET) is provided to the re-scaler SCA. According to this result RES(RET) the actual queue occupancy value Qact and the previous drop priority parameter are not re-scaled but are retained at the same value. These values are feed back to the updater UPD and to the second determiner DET2 in order to be used for the next decision cycle.

In the mean time the actual drop priority parameter value DPPact that still equals to 2 is also provided to the first comparator COMP1. The first comparator COMP1 compares the value of the actual drop priority parameter DPPact with the value of the drop priority of the packet. Since both values are equal the first comparator COMP1 results the acceptance decision by probabilistically dropping the packet P. This decision is provided to the output OUT of the controller CTRL.

Presume now that according to following decision cycles different packets are accepted in the buffer BUF whereby the instantaneous buffer filling level Qins has exceeded the maximum threshold Tmax but is again decreasing in time. It has to be remarked here that not only the input rate of the buffer but also the output rate of the buffer is influencing the instantaneous buffer filling level.

During a re-calculation step by the re-calculator CALC of a following decision cycle the instantaneous queue occupancy information INF-Qins is taken into account. Hereby it is decided to avoid the re-calculation of the instantaneous buffer filling level Qins and to substantially equalize the actual queue occupancy value Qact to the intermediate queue occupancy value Qint. Indeed, due to the decreasing instantaneous buffer filling level the actual queue occupancy as the average queue length will remain stable between the minimum and maximum threshold.

Furthermore, presume that the instantaneous filling level is however again increasing in time and hereby also the consecutive values for the actual queue occupancy value Qact.

During the next decision cycle for an incoming packet with a drop priority equal to 0 i.e. a green packet, the re-calculated intermediate queue occupancy value Qinit resulted in an actual queue occupancy value that exceeds the maximum threshold Tmax. This is confirmed by the second comparator COMP2 that provides hereby a down-re-scaling result RES(DO) to the re-scaler SCA. The re-scaler scales the previous drop priority parameter value DPPprev down to a value of the plurality of drop priorities that is lower in range i.e. 2 becomes 1. Also, the actual queue occupancy value is re-scaled downwards. According to this preferred embodiment the provided re-scaled queue occupancy value REQ-act is equalized to the minimum threshold Tmin during this down-re-scaling.

The re-scaler SCA provides the actual drop priority parameter value DPPact to the first comparator COMP1 where the value is compared to the drop priority of the incoming packet. Since this incoming packet has a drop priority 0 that is lower as the actual drop priority parameter value 1, the packet is accepted by the first comparator COMP1 that generates an acceptance decision, accordingly.

It has to be remarked that although according to the present description of the invention, the step of determining a previous drop priority parameter value DPPprev and the step of updating a queue occupancy variable Q are both mentioned as the first steps in the method, the method of the present invention is not limited to such an implementation. Indeed, it is obvious to a person skilled in the art to adapt the above mentioned description in order to execute both steps of the described decision cycle.

While the principles of the invention have been described above in connection with specific apparatus, it is to be clearly understood that this description is made only by way of example and not as a limitation on the scope of the invention, as defined in the appended claims.

What is claimed is:

1. A method for use in a telecommunication system to generate an acceptance decision during a decision cycle that comprises whether to accept an incoming packet of a data stream in a buffer, said incoming packet having a drop priority which is one of a plurality of predetermined drop priorities, said method comprising the steps of:

determining for a drop priority parameter an actual drop priority parameter value out of said plurality of drop priorities; and comparing said drop priority parameter with said drop priority of said packet in order to generate said acceptance decision; and characterized in that said step of determining said actual drop priority parameter value comprises the steps of:

determining a previous drop priority parameter value by means of any one of an initial value and a previous actual drop priority parameter value having been determined during a previous decision cycle;

updating a queue occupancy variable as a function of a previous re-scaled queue occupancy value having been determined during a previous decision cycle and providing thereby an intermediate queue occupancy value; and re-calculating said intermediate queue occupancy value of said queue occupancy variable as a function of instantaneous queue occupancy information of said buffer and providing thereby an actual queue occupancy value;

comparing said actual queue occupancy value with any one of a minimum threshold and a maximum threshold and providing thereby a result; and according to said result re-scaling said actual queue occupancy value and said previous drop priority parameter value and providing thereby, respectively, a re-scaled queue occupancy value and said actual drop priority parameter value.

2. The method according to claim 1, characterized in that said step of comparing said actual queue occupancy value with any one of a minimum threshold and a maximum threshold comprises in the event said actual queue occupancy value becomes smaller than said minimum threshold using as said result an re-scaling result; and in the event said actual queue occupancy value becomes greater than said maximum threshold using as said results a down-re-scaling result; and in the event when said actual queue occupancy value remains between said minimum threshold and said maximum threshold using as said result a retaining result.

3. The method according to claim 1, characterized in that said result comprises any one of an up-re-scaling result, a down-re-scaling result or a retaining result and that in the event said result comprises an up-re-scaling result, scaling up said actual queue occupancy and scaling up said previous drop priority parameter value to a value which is one of said plurality of drop priorities higher than said previous drop priority parameter value; and in the event said result comprises a down-re-scaling result, scaling down said actual queue occupancy value and scaling down said previous drop priority parameter value to a value which is one of said plurality of drop priorities lower than said previous drop priority parameter value; and in the event said result comprises a retaining result, retaining said actual queue occupancy and said previous drop priority parameter value.

4. The method according to claim 1, characterized in that said method comprises, in the event said drop priority parameter equals said drop priority, forming said acceptance decision by probabilistically dropping said packet; and in the event said drop priority parameter is bigger than said drop priority, forming said acceptance decision by accepting said packet; and in the event said drop priority parameter is smaller than said drop priority forming said acceptance decision by discarding said packet.

5. The method according to claim 1, characterized in that said step of re-calculating said intermediate queue occupancy value of said queue occupancy variable as a function of instantaneous queue occupancy information of said buffer comprises substantially equalizing said actual queue occupancy value to said intermediate queue occupancy value in the event when any one of:

an instantaneous queue occupancy information comprises an instantaneous buffer filling level above said maximum threshold but said instantaneous buffer filling level is decreasing in time; and an instantaneous queue occupancy information comprises an instantaneous buffer filling level below said minimum threshold but said instantaneous buffer filling level is increasing in time.

6. A controlling device for use in a telecommunication system to generate an acceptance decision during a decision cycle that comprises whether to accept an incoming packet of a data stream in a buffer, said incoming packet having a drop priority which is any one of a plurality of predetermined drop priorities provided to a first input of said controlling devices, characterized in that said controlling device comprises:

first determining means to determine for a drop priority parameter an actual drop priority parameter value out of said plurality of drop priorities; and first comparing means coupled to said first determining means and said first input to compare said actual drop priority parameter value with said drop priority of said packet and to generate thereby said acceptance decision, characterized in that said first determining means further comprises:

second determining means to determine a previous drop priority parameter value by means of any one of an initial value and a previous actual drop priority parameter value being determined during a previous decision cycle; and updating means to update a queue occupancy variable as a function of a previous re-scaled queue occupancy value that has been determined during previous decision cycle and to provide thereby an intermediate queue occupancy value; and re-calculating means coupled to said updating means and to said buffer to re-calculate said intermediate queue occupancy value of said queue occupancy variable as a function of instantaneous queue occupancy information of said buffer and to provide thereby an actual queue occupancy value; and second comparing means coupled to said re-calculating means to compare said actual queue occupancy value with any one of a minimum threshold and a maximum threshold and to provide thereby a result; and re-scaling means coupled to said re-calculating means and to said second comparing means to re-scale, according to said result, said actual queue occupancy value and said previous drop priority parameter value and to provide thereby, respectively, a re-scaled queue occupancy value and said actual drop priority parameter value.

7. A telecommunication network that comprises a buffer, characterized in that said telecommunication network further comprises a controlling device according to claim 6 to generate an acceptance decision during a decision cycle that comprises whether to accept an incoming packet of a data stream in said buffer, said incoming packet (P) having a drop priority being anyone of a plurality of predetermined drop priorities.

* * * * *